United States Patent
Södergård

[15] 3,650,895
[45] Mar. 21, 1972

[54] GUIDE TUBE FOR A CONTROL ROD IN A NUCLEAR REACTOR

[72] Inventor: Bengt Martin Södergård, Vasteras, Sweden

[73] Assignee: Allmanna Svenska Elektriska Aktiebolaget, Vasteras, Sweden

[22] Filed: Apr. 22, 1968

[21] Appl. No.: 723,061

[30] Foreign Application Priority Data

Apr. 25, 1967 Sweden..................................5787/67

[52] U.S. Cl.....................................176/44, 176/33, 176/34, 176/54
[51] Int. Cl............................................................G21c 1/08
[58] Field of Search ..................................176/54, 33, 34, 44

[56] References Cited

UNITED STATES PATENTS 3,150,052  9/1964  Stoker et al...............................176/54
3,385,758  5/1968  Gyorey et al. .............................176/33

Primary Examiner—Reuben Epstein
Attorney—Jennings Bailey, Jr.

[57] ABSTRACT

In a BLWR exchangeable guide tubes for cruciform control rods are indirectly supported by the bottom of the reactor vessel and carry at their upper ends square support blocks, each being provided with four holes for four fuel assemblies, said holes being symmetrically distributed around a central cruciform slot for the control rod. The support blocks are arranged in an edge to edge relationship, thus forming an even bottom for the core volume. Each guide tube has at its upper end four depressions, thereby obtaining a cruciform cross section and permitting flow of coolant from outside the tubes to the fuel assemblies.

2 Claims, 7 Drawing Figures

INVENTOR.
BENGT MARTIN SÖDERGÅRD

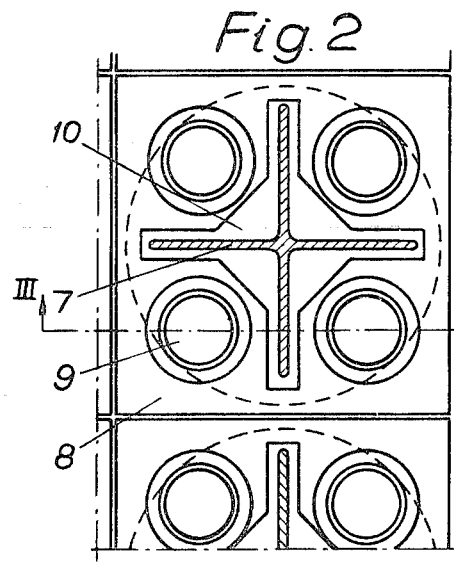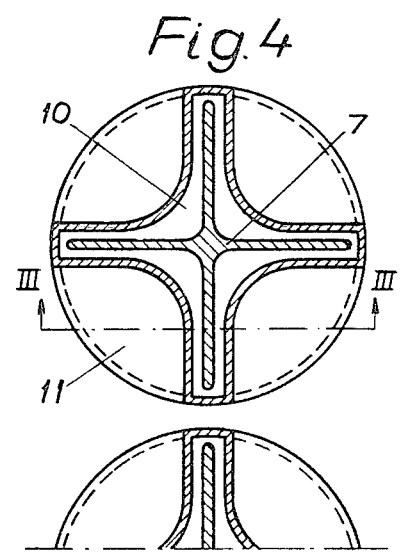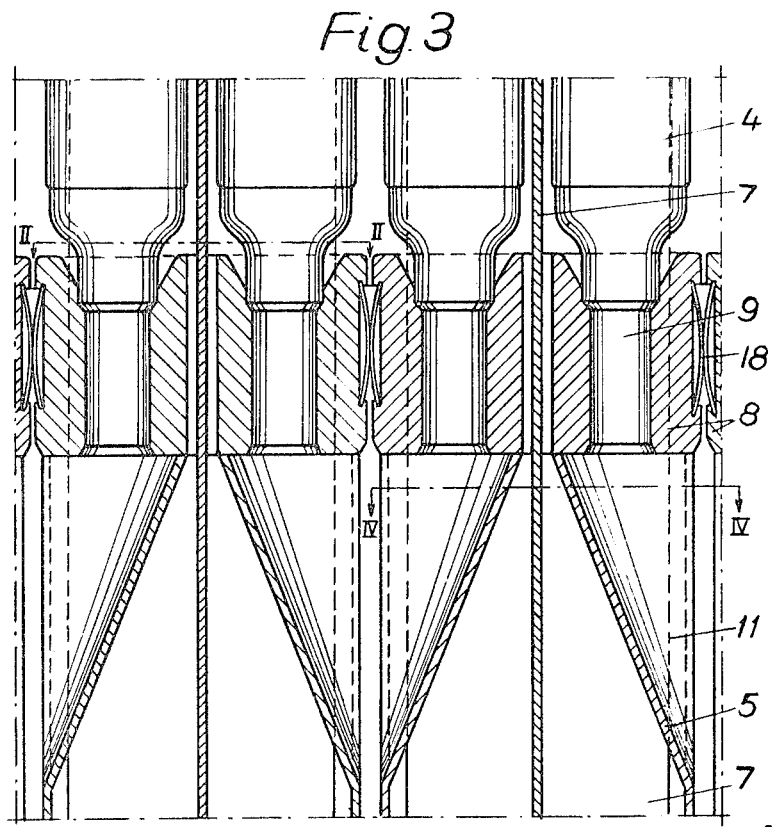

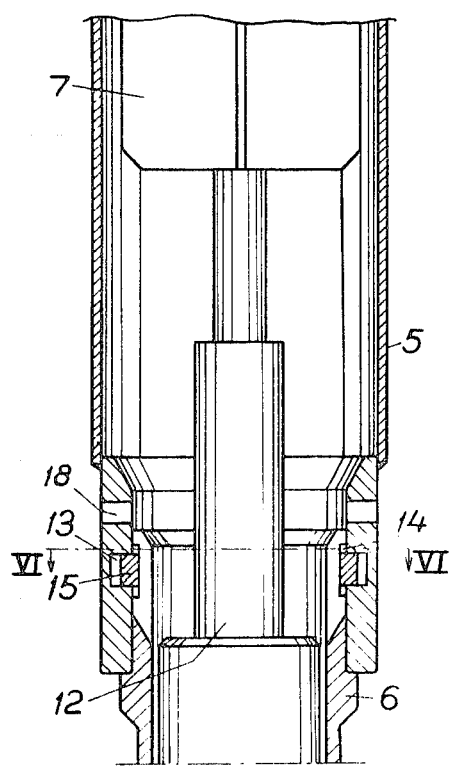
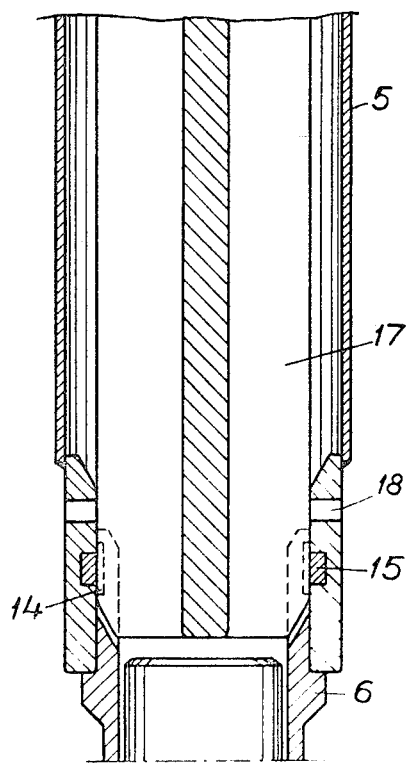
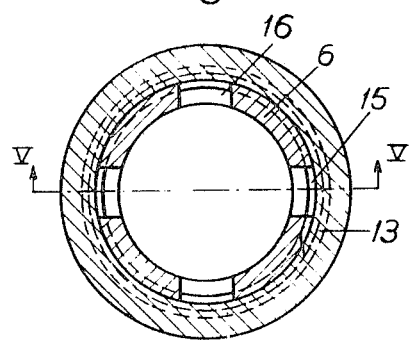
INVENTOR.
BENGT MARTIN SÖDERGÅRD

GUIDE TUBE FOR A CONTROL ROD IN A NUCLEAR REACTOR

BACKGROUND OF THE INVENTION

1. Field of the Invention

The invention relates to the mounting of control rods in a nuclear reactor, especially of the boiling light water type.

2. The Prior Art

The core in a nuclear reactor of the boiling light water type is built up of a great number of fuel assemblies. These are arranged with gaps between them into which control rods can be inserted. Each control rod can be withdrawn from its slot into a guide tube below the core. The fuel assemblies rest on the base or bottom of the core. This bottom must therefore by very well supported, but at the same time it must be possible with reasonable ease to replace a guide tube.

SUMMARY OF THE INVENTION

According to the invention this is done by dividing the bottom of the core into separate blocks, each of which is supported by a guide tube. In this way it is possible, without dismantling the entire core bottom for the repair of a guide tube, to take this tube out of the nuclear reactor together with its support block.

The guide tube may in turn suitably rest on leading-in tubes for the operating rod which connects the control rod to a control drive. The weight of the support block carried by the guide tube and that of the appertaining fuel assemblies is taken up by said leading-in tube and transferred to the wall of the reactor pressure vessel.

The support blocks are suitably made square with the sides being approximately the same length as the diameter of the guide tube and provided with four through holes arranged in a square for the fuel assemblies. The guide tube is provided at its upper end with four depressions corresponding to said four holes so that the space outside the guide tubes by means of said depressions communicates with the holes in the support block.

Thus each support block carries four fuel assemblies which are usually made with square cross section for the shroud tube. Between the four fuel assemblies a cruciform slot is formed in which runs a control rod with cruciform cross section. A cruciform opening is arranged for said control rod in the support block, to which opening the guide tube fits due to its depressions, so that the holes for the fuel assemblies open out outside the guide tube and the cruciform slot inside. This is important since the cooling water is led in at the bottom of the core to the fuel assemblies and to the slot between them. The cooling water for the fuel assemblies should suitably comprise 95 percent of the total quantity and flow outside the guide tubes and in through the holes in the support plates to the fuel rods inside the casing tubes. The remainder of the cooling water, which amounts to 5 percent of the total flow, is led through small holes in the guide tubes and up through these to the cruciform slot between the fuel assemblies.

BRIEF DESCRIPTION OF THE DRAWINGS

The invention is best understood with reference to the accompanying drawings which show one embodiment of the invention.

FIG. 2 shows the core bottom seen from above and

FIG. 3 a vertical section of the core bottom and adjacent parts, such as fuel assemblies and guide tubes.

FIG. 4 shows a section on the line IV—IV of FIG. 3.

FIGS. 5, 6 and 7 show the construction of the guide tube with the supporting leading-in tube and how the guide tube can easily be detached from the leading-in tube.

In FIG. 1, 1 designates the reactor pressure vessel and 2 a moderator tank with the core bottom 3. The fuel assemblies 4 are arranged inside the moderator tank. Below the core space is left for the guide tubes 5 which in turn rest on leading-in tubes 6. These tubes 6 are attached to the pressure vessel 1.

In the cruciform slot between four fuel assemblies 4 is a movable control rod 7. FIG. 2 shows how the core bottom 3 is divided into a number of support blocks 8. Each of these blocks is substantially square and is provided with four through holes 9 arranged in a square. Each block 8 is also provided with a cruciform opening 10 for the control rod 7. The holes 9 are intended for the fuel assemblies 4.

In FIG. 3, 8 designates a support block for four fuel assemblies. This support block is carried by the guide tube 5. The fuel assemblies 4 are arranged in the holes 9 in the block. Through the depressions 11 in the guide tubes 5 and the holes 9 the cooling water is led from the outside of the guide tubes 5 to the inside of the shroud tubes of the fuel assemblies 4. A part of the cooling water is led through openings 18 drilled in the guide tube 5, into the guide tube and through the tube up to and through the cruciform slot or opening in the support block 8 and in between the fuel assemblies 4 in the core.

FIG. 4 shows a section on the line IV—IV of FIG. 3. This figure shows how, by means of depressions 11, the guide tube 5 fits rather well to the cruciform opening 10 in the support block 8 and also that these depressions are made so that the holes 9 will be out on the outside of the guide tube 5.

FIG. 5 shows the joint between the guide tube 5 and the leading-in tube 6. 7 is the control rod and 12 an operating rod for the control rod. The guide tube 5 is provided at its lower end with a slot 13 and there is a corresponding slot 14 in the leading-in tube 6. These slots are locked together by means of a cut, resilient ring 15 which has greater height than the depth of the slot 14 but the same or less height than the depth of the slot 13.

FIG. 6, furthermore, shows that the upper part of the leading-in tube 6 is provided with four notches 16 arranged in pairs opposite to each other. In this way the open resilient ring 15 is exposed at four points along its periphery.

FIG. 7 shows how, by means of a cruciform tool 17 fitting the notches 16, it is possible to expand the diameter of the ring 15 so that it is inserted right into the slot 13. Thus the guide tube 5 and the tool 17 can be pulled upwards and detached from the leading-in tube 6 without being impeded by the ring 15 engaging in the slot 14.

Figure 1:
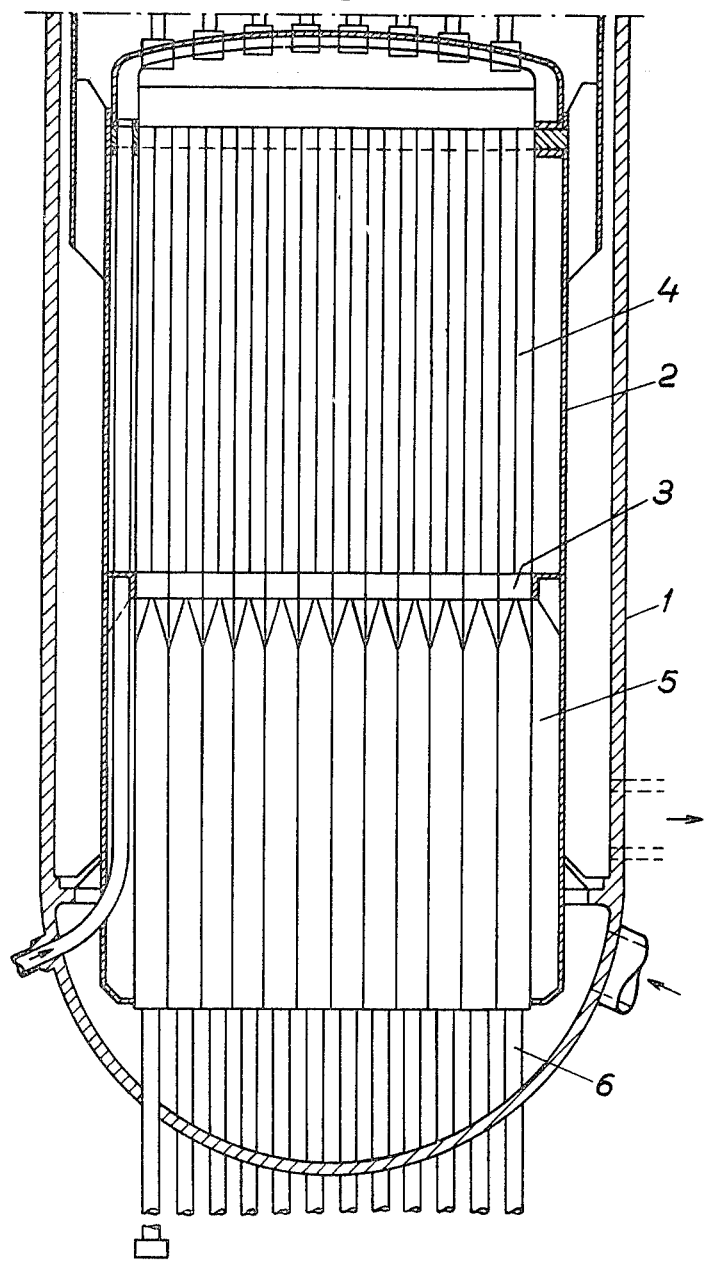
FIG. 1 shows the lower part of a boiling light water reactor pressure vessel, that is the part of the vessel comprising the core volume itself and the guide tubes underneath for the control rods.

The sides of the support blocks 8 should lie as close to each other as methods of manufacture permit. The blocks will thus together form a flat bottom 3 for the core. The square outer contour common to the blocks may be connected to a flat plate which is a continuation of the core bottom 3 out to the cylindrical vessel 1. Even better sealing between the blocks can be effected by means of suitable seals 18 as indicated in FIG. 3. It should also be pointed out that the weight of all the fuel assemblies is evenly distributed over the guide tubes and, through these and the leading-in tubes, transferred to the pressure vessel 1. Thermal stresses on the core bottom 3 are also prevented since the blocks 8 can slide against each other. The previously mentioned tool 17 is also suitably provided with a gripping means on a level with the block 8 so that the guide tube 5 and block 8 can be freed and lifted with the same tool 17. In conclusion, the invention makes the inlet nozzles of the fuel assemblies and the cruciform slot more easily and effectively accessible than in previously known constructions. Another advantage with the invention is that, when the guide tube has been removed, the lower part of the pressure vessel is free for inspection.

I claim:

1. A nuclear reactor comprising a reactor vessel, a reactor core surrounded by said vessel, and a plurality of square core support block means arranged in an edge to edge relationship to form a flat bottom for said core, a plurality of vertical tubes, each of said block means being carried by the upper end of one of said vertical tubes, a bottom part of said reactor vessel supporting said vertical tubes at least indirectly from beneath, a plurality of control rods, each vertical tube constituting a guide tube for a control rod which is vertically movable in said guide tube and has a cruciform cross section, said core comprising a plurality of vertical fuel assemblies having bottom parts, each of said block means having a central cruciform slot for admitting passage of the control rod therethrough and four through holes arranged in the four corners of a square for receiving the bottom parts of four of said vertical fuel assemblies and supporting said four fuel assemblies, wherein the improvement comprises each control rod guide tube having at its upper end four depressions and fitting against said cruciform slot, thereby forming two different flow paths for a coolant, one path leading from a space outside the guide tubes past the depressions and up through the holes into the fuel assemblies, and the other path leading from the inside of the guide tubes up through the cruciform slots to a space outside the fuel assemblies.

2. A reactor as claimed in claim 1, wherein each control rod is connected to an operating rod, a plurality of vertical leading-in tubes penetrating the bottom part of the reactor vessel, each operating rod being vertically movable in one of said leading-in tubes, and each control rod guide tube being at its lower end detachably connected to one of said leading-in tubes at its upper end.

* * * * *